United States Patent [19]

Hashimoto

[11] Patent Number: 4,958,604
[45] Date of Patent: Sep. 25, 1990

[54] DIRECT FUEL INJECTION TYPE SPARK IGNITION INTERNAL COMBUSTION ENGINE

[75] Inventor: Eiji Hashimoto, Susono, Japan

[73] Assignee: Toyota Jidosha Kabushiki Kaisha, Japan

[21] Appl. No.: 303,940

[22] Filed: Jan. 30, 1989

[30] Foreign Application Priority Data

Feb. 10, 1988 [JP] Japan .................................. 63-27693
Feb. 12, 1988 [JP] Japan .................................. 63-16266

[51] Int. Cl.5 ............................................. F02B 23/10
[52] U.S. Cl. .................................... 123/276; 123/260; 123/302; 123/305; 123/661
[58] Field of Search ............... 123/276, 279, 260, 261, 123/302, 305, 661

[56] References Cited

U.S. PATENT DOCUMENTS

| 4,009,702 | 3/1977 | Mayer | 123/276 |
| 4,522,173 | 6/1985 | Agache | 123/276 |
| 4,852,525 | 8/1989 | Ishida | 123/276 |

FOREIGN PATENT DOCUMENTS 54-81005 6/1979 Japan .
55-97129 7/1980 Japan .
61-173728 10/1986 Japan .
62-659 1/1987 Japan .
62-17339 1/1987 Japan .
62-82222 4/1987 Japan .
62-162721 7/1987 Japan .
62-162722 7/1987 Japan .
62-191622 8/1987 Japan .
63-40527 3/1988 Japan .
63-117150 5/1988 Japan .

Primary Examiner—Andrew M. Dolinar
Attorney, Agent, or Firm—Oliff & Berridge

[57] ABSTRACT

A direct fuel injection type spark ignition internal combustion engine includes a combustion chamber including a shallow dish portion and a deep dish portion formed in a piston top portion, a spark plug located close to an axis of the combustion chamber, and a fuel injection nozzle located at a radially outermost portion of the combustion chamber. With this arrangement, a good ignition characteristic in a low engine load operation and an improved power characteristic in a high engine load operation are obtained. Further, due to that arrangement of the spark plug, the flame propagation distance is made as short as possible.

17 Claims, 8 Drawing Sheets

DIRECT FUEL INJECTION TYPE SPARK IGNITION INTERNAL COMBUSTION ENGINE

BACKGROUND OF THE INVENTION

1. Field of the Invention

The present invention relates to a direct fuel injection type spark ignition internal combustion engine in which fuel is directly injected into a cylinder of the engine onto a surface of a recessed dish portion formed in a top portion of the piston. The fuel adhering to the surface of the dish portion is evaporated to generate a combustible gas which is ignited by a spark plug.

2. Description of the Related Art

Direct fuel injection type spark ignition internal combustion engines are disclosed, for example, in Japanese Patent Publications SHO 62-82222, SHO 62-17339, and SHO 62-659; and Japanese Utility Model Publications SHO 61-173728, and SHO 54-81005. Among them, Japanese Patent Publication SHO 62-82222 discloses a locational relationship between ports and a spark plug or a fuel injection nozzle. Japanese Utility Model Publication SHO 61-173728 discloses a piston/cylinder arrangement with a shallow recessed dish portion and a deep recessed dish portion formed in a top portion of a piston. FIGS. 15 and 16 illustrate the engine of Japanese Patent Publication SHO 62-82222 except the reference numerals; and FIG. 17 illustrates the piston of the engine of Japanese Utility Model Publication SHO 61-173728 except the reference numerals.

In the engine illustrated in FIGS. 15 and 16, a spark plug 122, which is difficult to be designed compact in size, extends between two exhaust valves 108 and 109, and a lower end portion of spark plug 122 is located close to a center of a combustion chamber. A fuel injection nozzle 123, which is comparatively easy to be designed small in size, extends between two intake valves 106 and 107, and a lower end portion of fuel injection nozzle 123 is located close to the center of the combustion chamber so as to oppose the lower end portion of spark plug 122. This arrangement prevents interference in location between spark plug 122 and fuel injection nozzle 123. Further, because the lower end portions of the spark plug 122 and the fuel injection nozzle 123 are located close to each other and oppose each other, fuel injected from fuel injection nozzle 123 directly collides with spark plug 122 so that prompt ignition is performed In the engine illustrated in FIG. 17, a combustion chamber 220 includes a shallow dish portion 221 and a deep dish portion 222 both formed in a top portion of the piston. Unlike the present invention, shallow and deep dish portions 221 and 222 of the engine of FIG. 17 are arranged at a radially central portion of the piston so that the dish portions 221 and 222 and the piston have their axes in common. A spark plug 205 is greatly offset in a radial direction from the axis of the piston.

However, as will be illustrated below, some problems exist in the prior art engines.

With respect to the engine of FIGS. 15 and 16, in the case where the amount of fuel to be injected is determined so that optimum combustion is obtained in a low engine load operation, when a greater amount of fuel is supplied in a high engine load operation than the amount determined on the basis of the low engine load operation, the fuel will not be perfectly burned and the non-burned fuel is likely to cause smoking in the vicinity of spark plug 122 and also in the exhaust gas. On the contrary, in the case where the amount of fuel to be injected is determined so that optimum combustion is obtained in a high engine load operation, when less fuel is supplied in a low engine load operation than the amount determined on the basis of the high engine load operation, the mixed gas of fuel and air will be too lean to be smoothly burned, and it is difficult to form a rich gas layer around spark plug 122. In other words, in this engine, when the ignition characteristic is satisfied at low engine loads, the combustion characteristic corresponding to a power characteristic of the engine can not be satisfied; and when the power characteristic is satisfied at high engine loads, the ignition characteristic of the engine can not be satisfied. This means that the ignition characteristic at low engine loads and the power characteristic at high engine loads are not compatible with each other. In addition, because spark plug 122 is located between the two exhaust ports 112 and 113, the exhaust ports 112 and 113 have to be bent in the plan view thereof to provide therebetween a space for mounting the spark plug 122. The bent exhaust ports 112 and 113 will increase flow resistance of the exhaust gas and will decrease the engine power.

With respect to the engine of FIG. 17, the spark plug 205 is located far from the axis of the combustion chamber on the opposite side of the fuel injection nozzle with respect to the axis of the combustion chamber, thereby increasing a flame propagation distance (defined as a distance from spark plug 205 to the fuel injection nozzle). As a result, the combustion characteristic of the engine will drop in comparison with that of an engine with a short flame propagation distance. Further, because the engine of FIG. 17 does not illustrate the relationship between ports and spark plug 205 or the fuel injection nozzle, even if the arrangement of FIG. 17 were attempted to be applied to a multiport engine, for example, an engine with two intake ports and one exhaust port, it would be very difficult to arrange the fuel injection nozzle and the spark plug in the limited space between the ports of such a multiport engine.

SUMMARY OF THE INVENTION

An object of the invention is to provide a direct fuel injection type spark ignition internal combustion engine where an ignition characteristic at low engine loads and a power characteristic at high engine loads are compatible with each other, thus obtaining good ignition and power characteristics.

Another object of the invention is to further provide a direct fuel injection type spark ignition internal combustion engine with multiports where a spark plug and a fuel injection nozzle are skillfully arranged in a limited space between the ports so that the flame propagation distance is sufficiently short and smooth combustion is obtained.

The above-described objects can be attained by a direct fuel injection type spark ignition internal combustion engine in accordance with the present invention. The engine comprises: a piston/cylinder structure including a cylinder, a piston reciprocally movable in the cylinder, and a cylinder head located above the cylinder. The piston includes a shallow recessed dish portion and a deep recessed dish portion formed in a top portion of the piston. An inside surface of the cylinder, an upper surface of the piston including surfaces of the shallow and deep dish portions, and a lower surface of the cylinder head define a combustion chamber. The piston/cylinder structure also includes two intake ports and at least one exhaust port formed in the cylinder head and communicating with the combustion chamber. A spark plug is located adjacent to an axis of the combustion chamber and coupled to the cylinder head so as to protrude into the combustion chamber from the lower surface of the cylinder head. A fuel injection nozzle having at least one fuel injection hole is located at a radially outer portion of the combustion chamber, and a fuel injection direction and a fuel injection timing of the fuel injection nozzle are predetermined for high and low engine load operations. More particularly, the fuel infection nozzle injects a fuel injected toward the shallow dish portion at an early stage of an injection period of a fuel injection timing in a high engine load operation, and injects a fuel injected toward the deep dish portion at a late stage of the injection period of the fuel injection timing in the high engine load operation and during an entire stage of an injection period of a fuel injection timing in a low engine load operation.

In the engine having the above-described structure or arrangement, the fuel injected from the fuel injection nozzle collides with a surface of the shallow dish portion or the deep dish portion, and then the fuel having adhered to the surface is evaporated at the surface of the dish portion to generate an evaporated fuel which is then conveyed to the spark plug and mixed with the intake gas introduced into the combustion chamber by a swirl formed in the combustion chamber. Then, the mixed gas is ignited by the spark plug.

In the low engine load operation where the fuel begins to be injected later than in the high engine load operation and thus the period of fuel injection time is shorter than in the high engine load operation, almost all of the fuel is injected into the deep dish portion because the piston has been moved to a high position. The fuel is evaporated at the surface of the deep dish portion. Though the evaporated fuel is swirled by the swirl of the intake gas formed in the combustion chamber, almost all of the evaporated fuel remains in the deep dish portion without flowing out of the deep dish portion, because there is only a very short period of time until the piston reaches its nearly highest position where the evaporated fuel is ignited by the spark plug. The evaporated fuel is conveyed, maintaining its richness, to a pocket portion of the deep dish portion and is ignited by the spark plug when the piston comes to its nearly highest position and the pocket portion receives the spark plug therein. Because the evaporated fuel conveyed to the pocket portion remains rich, a smooth ignition is obtained In the high engine load operation where the fuel injection begins at an early time and thus the period of fuel injection time is long in comparison with that in the low engine load operation, the fuel injected at the early stage of the fuel injection period is injected into the shallow dish portion because the piston is at a comparatively low position. The fuel injected onto the surface of the shallow dish portion can be evaporated perfectly because there is a sufficiently long period of time until the evaporated fuel is ignited. The evaporated fuel is swirled by the swirl of the intake gas and is sufficiently mixed with the intake gas. Thus, the gas around the spark plug is prevented from becoming too rich, and a good ignition is obtained, though the fuel is injected for a comparatively long period of time and accordingly a great amount of fuel is injected into the combustion chamber in the high engine load operation. Though the fuel injected at the late stage of the fuel injection period in the high engine load operation is injected into the deep dish portion like in the low engine load operation and accordingly there may be a too short period of time for the fuel to be perfectly evaporated at the surface of the deep dish portion, the above-described good combustion of the fuel injected at the early stage of the fuel injection period causes the fuel injected at the late stage of the injection period to be perfectly burned. Thus, almost all of the injected fuel can be burned perfectly and, as a result, the power characteristic at high engine loads is greatly improved.

Further, because the spark plug is located close to the axis of the combustion chamber and, thus, the spark plug can be arranged so as to vertically extend at a position surrounded by the two intake ports and the exhaust port, interference in location between the ports and the spark plug can be effectively prevented. Because the fuel injection nozzle is located at the radially outer portion of the combustion chamber and, thus, the fuel injection nozzle can be located between the two intake ports, it becomes possible to use the space between the two intake ports, which was a non-used dead space in the prior art engine, for locating the fuel injection nozzle. These arrangements help to skillfully locate the spark plug and the fuel injection nozzle in the multiport engine and to permit compact design of the engine.

Furthermore, the arrangement that the spark plug is located close to or adjacent the axis of the combustion chamber makes the flame propagation distance as short as possible whereby a good combustion is obtained. In addition, according to the spark plug arrangement, there is no necessity to arrange the spark plug between the exhaust ports unlike in the prior art engine, and the exhaust ports can be arranged so as to extend straight in the plan view thereof. The straight exhaust ports help to decrease flow resistance of the exhaust gas and to increase the engine power.

BRIEF DESCRIPTION OF THE DRAWINGS

The above and other objects, features and advantages of the present invention will become apparent and more readily appreciated from the following detailed description of the preferred embodiments of the invention taken in conjunction with the accompanying drawings, in which.

DETAILED DESCRIPTION OF THE PREFERRED EMBODIMENTS

Figure 3:
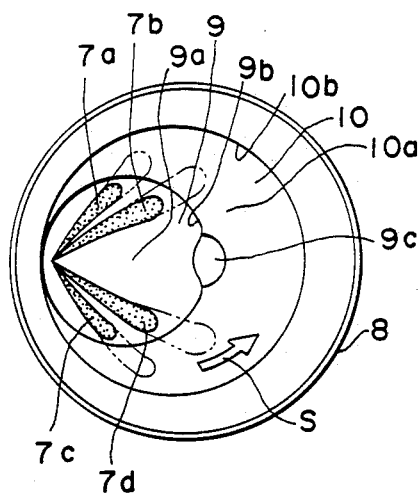
FIG. 3 is a plan view of a piston of the engine of FIG. 1.
Figure 4:
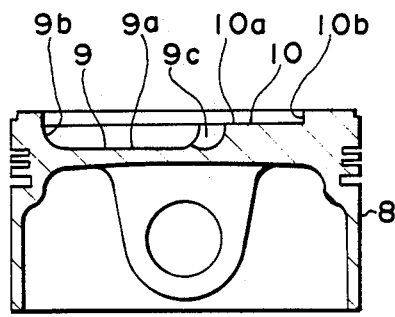
FIG. 4 is a cross-sectional view of the piston of FIG. 3.
Figure 5:
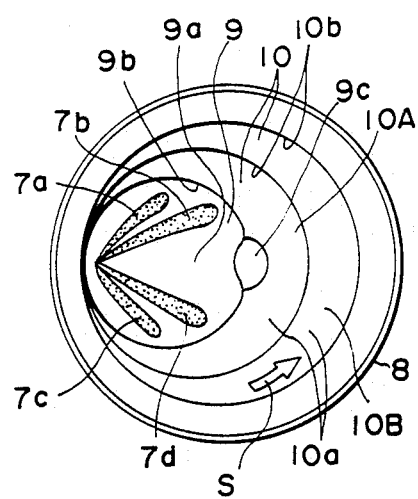
FIG. 5 is a plan view of a piston of an engine in accordance with a second embodiment of the present invention.
Figure 6:
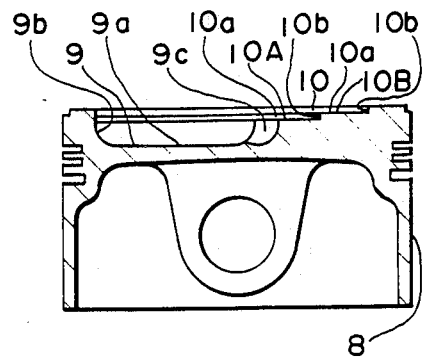
FIG. 6 is a cross-sectional view of the piston of FIG. 5.
Figure 7:
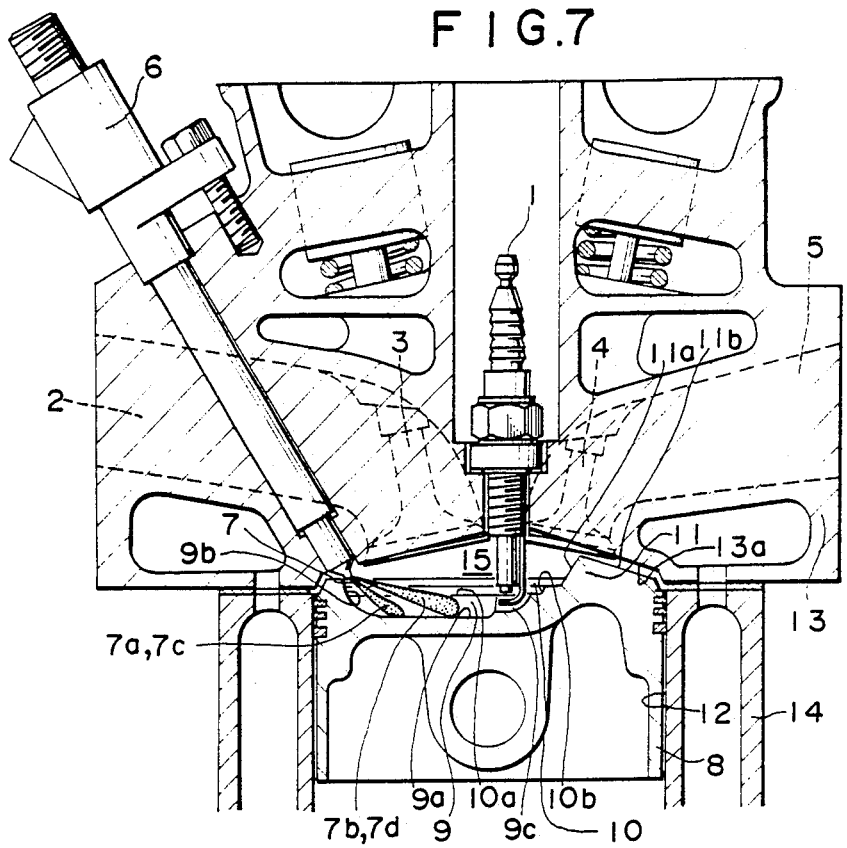
FIG. 7 is a cross-sectional view of a direct fuel injection type spark ignition internal combustion engine in accordance with a third embodiment of the present invention.
Figure 8:
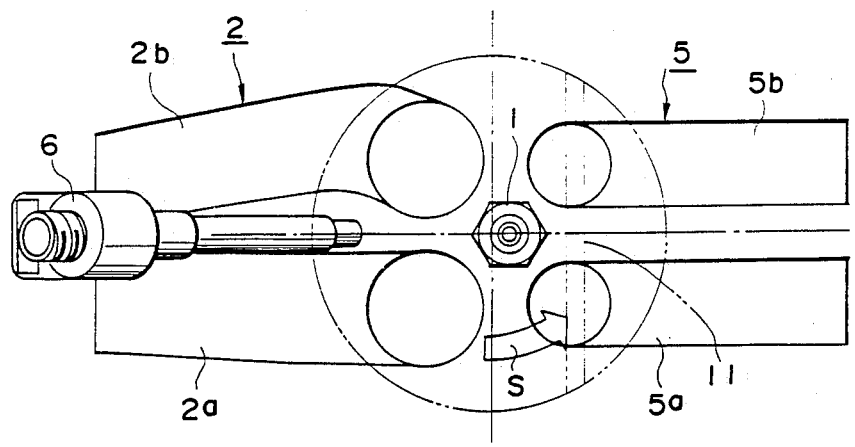
FIG. 8 is a plan view of the engine of FIG. 7.
Figure 9:
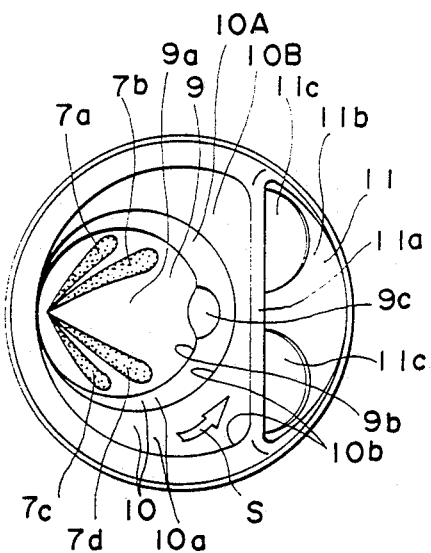
FIG. 9 is a plan view of a piston of the engine of FIG. 7.
Figure 11:
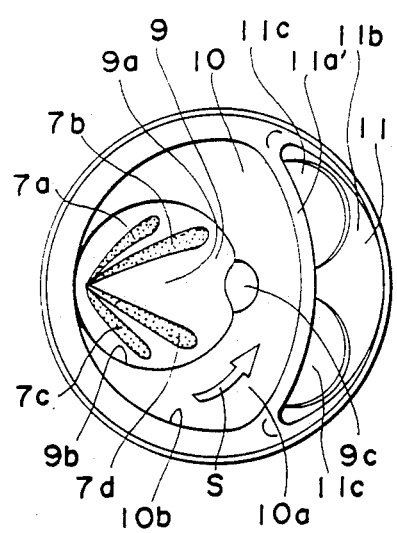
FIG. 11 is a plan view of a piston of an engine in accordance with a fourth embodiment of the present invention.
Figure 10:
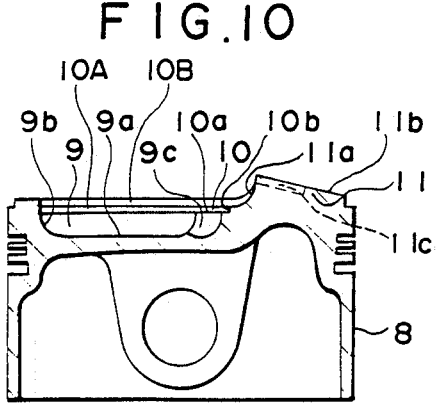
FIG. 10 is a cross-sectional view of the piston of FIG. 9.
Figure 12:
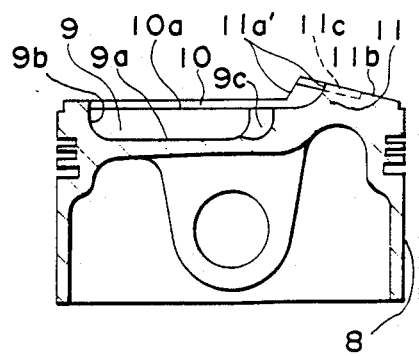
FIG. 12 is a cross-sectional view of the piston of FIG. 11.

FIGS. 1-4 illustrate a first embodiment, FIGS. 5-6 illustrate a second embodiment, FIGS. 7-10 illustrate a third embodiment, and FIGS. 11-12 illustrate a fourth embodiment, of the present invention. In those FIGS., the portions common in structure with respect to every embodiment are denoted by the same reference numerals.

Figure 1:
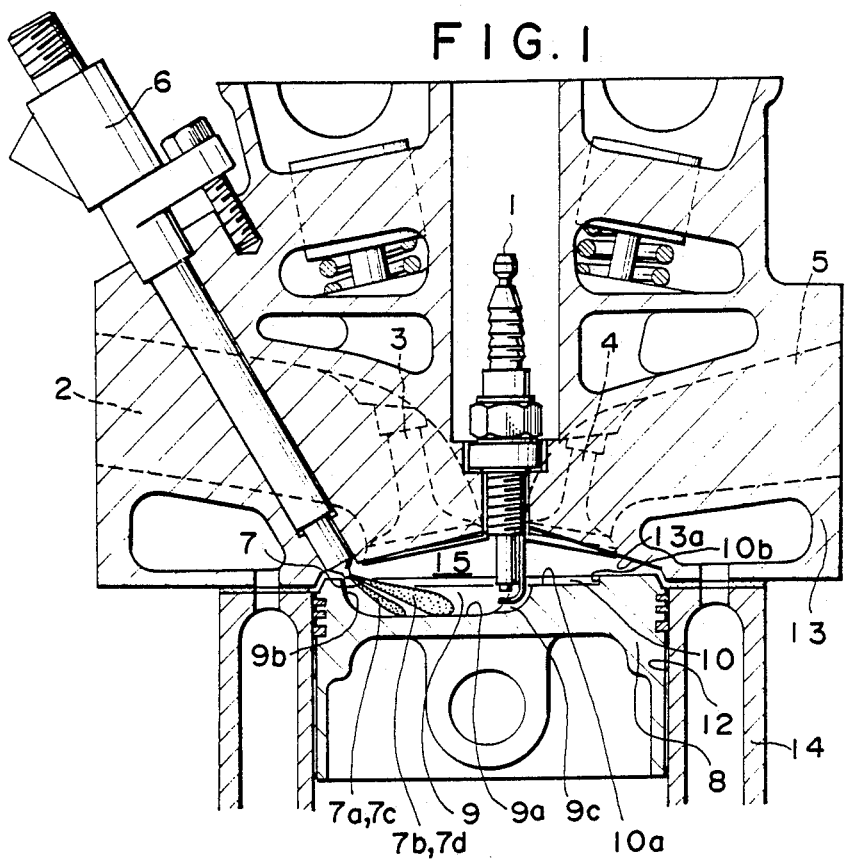
FIG. 1 is a cross-sectional view of a direct fuel injection type spark ignition internal combustion engine in accordance with a first embodiment of the present invention.
Figure 2:
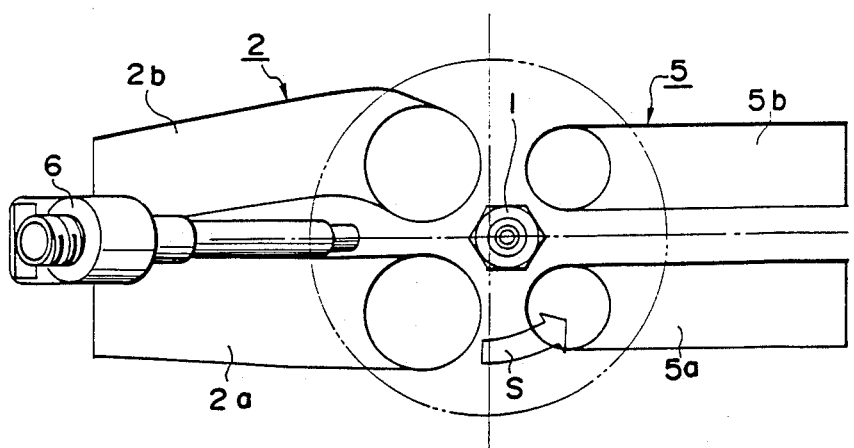
FIG. 2 is a plan view of the engine of FIG. 1.

Firstly, common structures with respect to every embodiment will be explained in reference with, for example, FIGS. 1-4. As shown in FIG. 1, the direct fuel injection type spark ignition internal combustion engine of the present invention includes a piston/cylinder structure with a cylinder (a cylinder bore) 12 formed in a cylinder block 14, a piston 8 reciprocally movable in cylinder 12, and a cylinder head 13 located above cylinder 12 and having an upwardly recessed lower surface 13a. Piston 8 includes a shallow, downwardly recessed dish portion 10 (which will be called a shallow dish portion 10 hereinafter) and a deep, downwardly recessed dish portion 9 (which will be called a deep dish portion 9 hereinafter) formed in a top portion of piston 8. Deep dish portion 9 is located so as to interfere in position with shallow dish portion 10 and, more specifically, is recessed downwardly from a bottom surface of shallow dish portion 10. An inside surface of cylinder block 14, an upper surface of piston 8 including the surfaces of shallow and deep dish portions 10 and 9, and lower surface 13a of cylinder head 13 define a combustion chamber 15 therein. A space defined in shallow dish portion 10 and a space defined in deep dish portion 9 compose one portion of combustion chamber 15. Two intake ports 2 (2a and 2b) and at least one exhaust port 5 are formed in cylinder head 13. In the embodiment, two exhaust ports 5a and 5b are provided as shown in FIG. 2. As shown in FIGS. 1 and 2, intake ports 2a and 2b and exhaust ports 5a and 5b communicate with combustion chamber 15. Intake valve 3 is provided at an opening end of each intake port 2 so as to open and close intake port 2, and exhaust valve 4 is provided at an opening end of each exhaust port 5 so as to open and close exhaust port 5.

A spark plug 1 is located close to an axis of combustion chamber 15 that is common with an axis of cylinder 12 and an axis of piston 8. A lower end portion of spark plug 1 extends downwardly from lower surface 13a of cylinder head 13 so as to protrude into combustion chamber 15. A fuel injection nozzle 6 is located at a radially outer portion of combustion chamber 15. Fuel injection nozzle 6 directly injects a fuel into cylinder 12. As is illustrated in the fuel injection timing diagram of FIG. 14, a fuel injection timing and fuel injection direction of fuel injection nozzle 6 is predetermined so as to inject a fuel injected at an early stage Pe of an injection period $P_H$ of the fuel injection timing in a high engine load operation toward shallow dish portion 10 in cooperation with the upward movement of piston 8 and to inject a fuel injected at a late stage Pl of the injection period $P_H$ of the fuel injection timing in the high engine load operation toward deep dish portion 9 in cooperation with the upward movement of piston 8. Further, the fuel injection timing and fuel injection direction of fuel injection nozzle 6 is predetermined so as to inject a fuel injected at an entire stage of an injection period $P_L$ in a low engine load operation toward deep dish portion 9 in cooperation with the upward movement of piston 8. Fuel injection begins earlier in the high engine load operation than in the low engine load operation, and injection period $P_H$ in the high engine load operation is longer than injection period $P_L$ in the low engine load operation. In other words, because piston 8 is not at a high position at the early stage Pe of injection period $P_H$ in the high engine load operation, the fuel obliquely injected from fuel injection nozzle 6 flows toward shallow dish portion 10. Because piston 8 is at a high position at the late stage Pe of injection period $P_H$ in the high engine load operation or at the entire stage of injection period $P_L$ in the low engine load operation, the injected fuel flows toward deep dish portion 9.

More particularly, as shown in FIG. 2, spark plug 1 is located at a position surrounded by intake ports 2a and 2b and exhaust ports 5a and 5b in the direction perpendicular to the axis of combustion chamber 15. Spark plug 1 upwardly extends from an upper portion of combustion chamber 15 substantially in parallel with the axis of combustion chamber 15. Fuel injection nozzle 6 is located between intake ports 2a and 2b. Fuel injection nozzle 6 obliquely extends from the radially outer portion of combustion chamber 15 in an upward and radially outward direction with respect to the axis of combustion chamber 15. An axis of spark plug 1 and an axis of fuel injection nozzle 6 are located in a common plane including the axis of combustion chamber 15, and fuel injection nozzle 6 is located on an opposite side of spark plug 1 with respect to the axis of combustion chamber 15.

As shown in FIGS. 3 and 4, an axis or center of shallow dish portion 10 and an axis or center of deep dish portion 9 are offset from the axis or center of piston 8 on the side close to fuel injection nozzle 6. The axis of deep dish portion 9 is more offset from the axis of piston 8 than the axis of shallow dish portion 10.

As shown in FIG. 3, contours of the deep dish portion 9 and at least the deepest portion of shallow dish portion 10 are circular in the direction perpendicular to the axis of combustion chamber 15. The circular contour of shallow dish portion 10 is larger in size than the circular contour of deep dish portion 9. The circular contours of shallow and deep dish portions 10 and 9 tangentially contact each other at portions thereof closest to fuel injection nozzle 6.

As shown in FIG. 4, shallow dish portion 10 has a flat bottom surface 10a extending in a direction perpendicular to the axis of piston 8 and a side surface 10b substantially upwardly extending from a radially outermost portion of bottom surface 10a. Similarly, deep dish portion 9 has a flat bottom surface 9a extending in the direction perpendicular to the axis of piston 8 and a side surface 9b curvedly connected to a radially outermost portion of bottom surface 9a and then upwardly extending up to an uppermost surface of piston 8.

As shown in FIGS. 3 and 4, deep dish portion 9 has a pocket portion 9c at a portion of deep dish portion 9 located on the opposite side of fuel injection nozzle 6 with respect to the axis of deep dish portion 9. Pocket portion 9c receives the lower end portion of spark plug 1 therein when piston 8 is moved to its nearly highest position during reciprocal motion thereof.

As shown in FIG. 2, intake port 2 includes a swirl port 2a for introducing an intake gas into combustion chamber 15 in a direction tangential to a circle having its center on the axis of combustion chamber 15 and having a diameter smaller than a diameter of combustion chamber 15. Intake port 2 further includes a port 2b for introducing an intake gas into combustion chamber 15 toward the axis of combustion chamber 15. Exhaust ports 5a and 5b extend straight in the plan view thereof.

Figure 13:
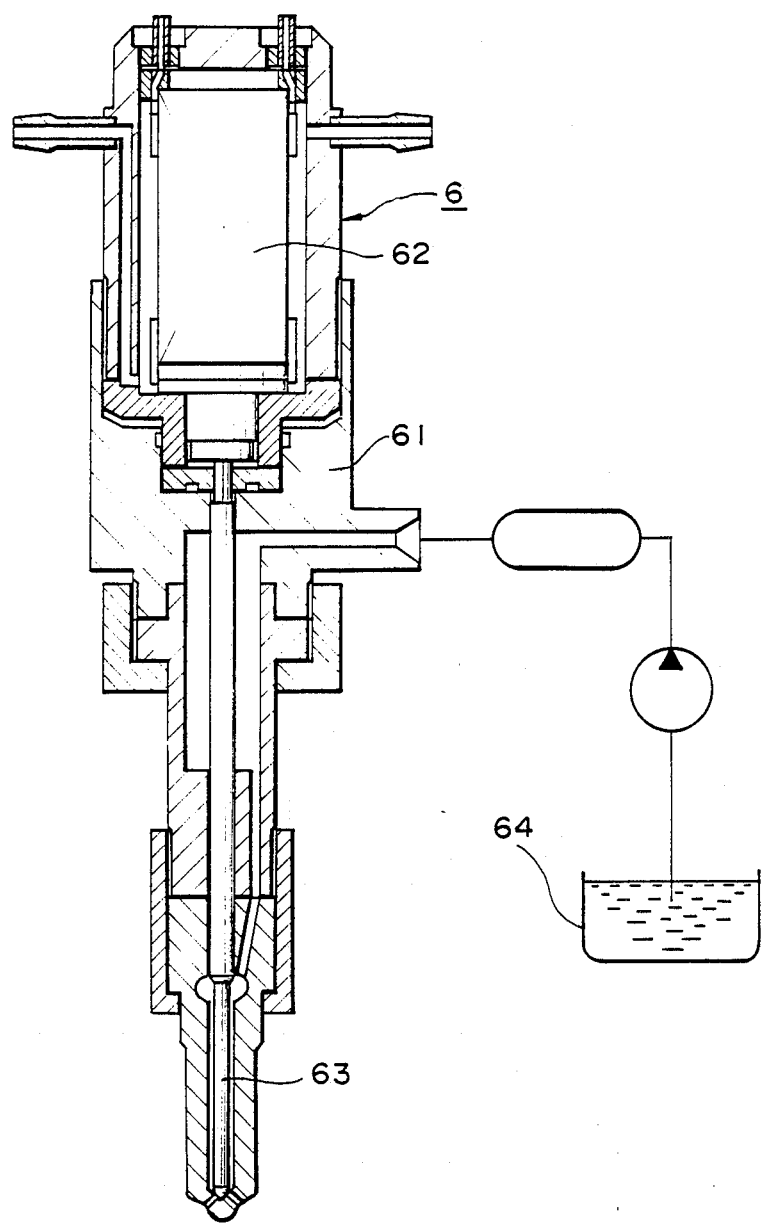
FIG. 13 is a cross-sectional view of a fuel injection nozzle applicable to an engine of any embodiment of the first through fourth embodiments of the present invention.

As shown in FIG. 13, fuel injection nozzle 6 comprises a nozzle having multiholes for injecting fuel. The number of the fuel injection holes is, for example, four, two of which are shown in FIG. 13. Fuel injection nozzle 6 includes a piezo-type actuator 62 (which may be an electro-magnetic type actuator) for driving a needle valve 63. Fuel from a fuel tank 64 is supplied to a fuel path formed in an injection body 61 and is injected through the fuel injection holes into the combustion chamber.

As shown in FIG. 3, at least one of the multiholes of fuel injection nozzle 6 is directed so as to inject a fuel toward a portion of the bottom or side surface 9a, 9b of deep dish portion 9 located on an upstream side of spark plug 1 in a direction of the swirl S formed in combustion chamber 15 at the late stage Pl of injection period $P_H$ in the high engine load operation and at the entire stage of injection period $P_L$ in the low engine load operation. The fuel injected toward the surface portion located upstream of spark plug 1 in the swirl direction causes the evaporated fuel evaporated at the surface portion to reach spark plug 1 and to form a rich gas layer in a very short period of time. It assures smooth ignition.

Next, structures specific to each embodiment will be explained.

In the first embodiment, as shown in FIGS. 3 and 4, shallow dish portion 10 comprises a single concave portion.

In the second embodiment, as shown in FIGS. 5 and 6, shallow dish portion 10 comprises at least two concave portions 10A and 10B which interfere with each other in location in a plan view thereof.

In the third embodiment, as shown in FIGS. 7-10, piston 8 includes, at one portion of its top portion located on the opposite side of fuel injection nozzle 6 with respect to the axis of piston 8, a protrusion 11 which upwardly protrudes so that protrusion 11 fills one portion of combustion chamber 15 located between the upper surface of protrusion 11 and lower surface 13a of cylinder head 13 when piston 8 comes to its highest position. Protrusion 11 has an upwardly extending side surface 11a on the side of protrusion 11 opposing spark plug 1 and an obliquely extending upper surface 11b extending from the uppermost portion of side surface 11a to the radially outermost periphery of piston 8. In upper surface 11b, a downwardly recessed portion 11c is formed to prevent upper surface 11b from interfering with exhaust valve 4 when piston 8 is at its highest position. Side surface 11a of protrusion 11 extends straight in a direction transverse to and perpendicular to an extension of a line connecting the axis of spark plug 1 and the axis of fuel injection nozzle 6.

In the fourth embodiment, as shown in FIGS. 11 and 12, side surface 11a' of protrusion 11, which corresponds to side surface 11a of the third embodiment, extends in an arc concave to spark plug 1 in a direction transverse to an extension of a line connecting the axis of spark plug 1 and the axis of fuel injection nozzle 6.

Next, operation common to every embodiment of the fuel injection nozzle will be explained.

Figure 14:
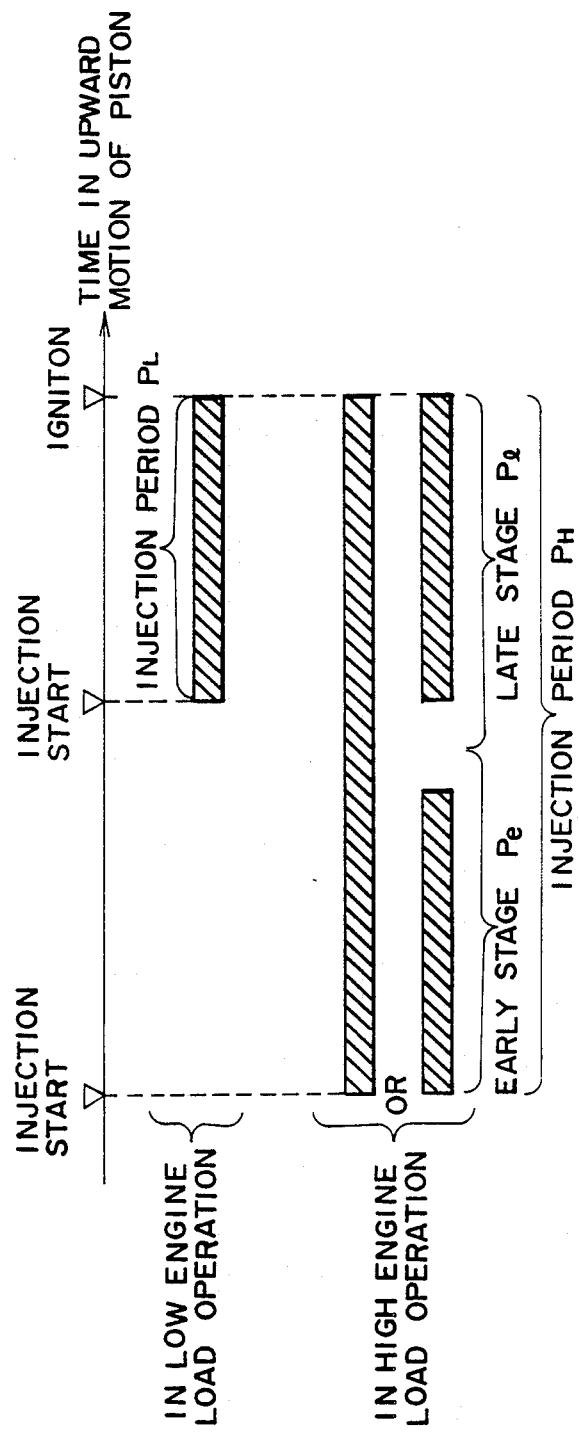
FIG. 14 is a diagram illustrating a fuel injection timing of the fuel injection nozzle of the present invention.
Figure 15:
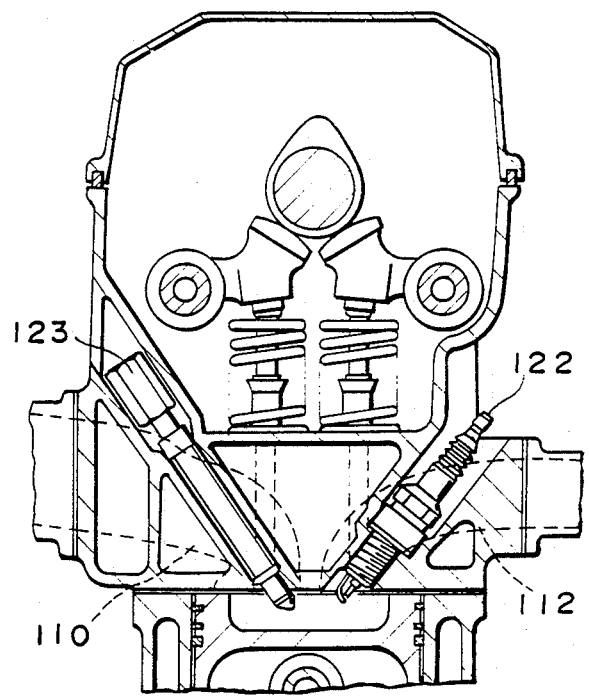
FIG. 15 is a cross-sectional view of an engine disclosed in Japanese Patent Publication SHO 62-82222 except the reference numerals.
Figure 16:
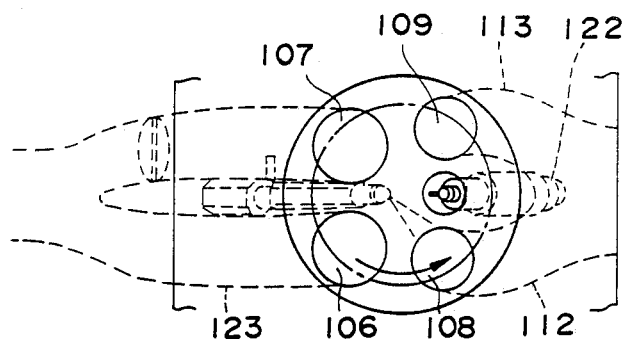
FIG. 16 is a plan view of the engine of FIG. 15.
Figure 17:
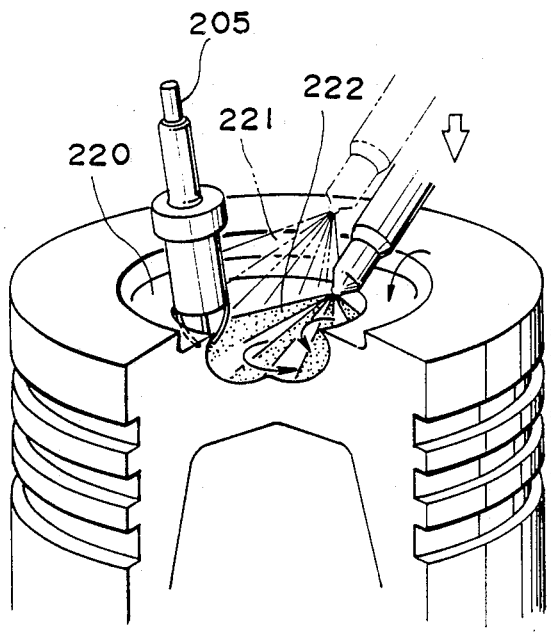
FIG. 17 is an oblique view of an engine disclosed in Japanese Utility Model Publication SHO 61-173728 except the reference numerals

In the low engine load operation, the amount of the fuel injected into combustion chamber 15 is small because the injection period $P_L$ is short as was discussed referring to FIG. 14. Because the fuel is injected late and piston 8 is at a sufficiently high position, the fuel obliquely injected from fuel injection nozzle 6 flows toward deep dish portion 9 and adheres onto surfaces 9a and/or 9b of deep dish portion 9. Then, the fuel is evaporated at surfaces 9a and 9b by heat from piston 8. The swirl S formed in combustion chamber 15, which is caused by the intake gas from swirl port 2a, helps to promote the evaporation. Because there is only a very short period of time when piston 8 comes to its nearly highest position and the evaporated fuel is ignited, almost all of the evaporated fuel remains in deep dish portion 9 and is mixed with substantially only the air swirling in deep dish portion 9. Thus, the mixed gas in deep dish portion 9 is sufficiently rich to be well burned. The evaporated fuel is conveyed by the swirl S to pocket portion 9c and momentarily stays in pocket portion 9c. When piston 8 comes to its nearly highest position and pocket portion 9c receives the lower end portion of spark plug 1 therein, the evaporated fuel in pocket portion 9c is ignited by spark plug 1 and the combustion propagates to the whole mixed gas swirling in deep dish portion 9 and in combustion chamber 15. Thus, the entire fuel is burned. With combustion in the low engine load operation, the mixed gas around spark plug 1, that is, the mixed gas in pocket portion 9c is sufficiently rich to be well burned and thus, the ignition characteristic is very good.

In the high engine load operation, the amount of the fuel injected into combustion chamber 15 is great because the injection period $P_H$ is long as was discussed referring to FIG. 14. The combustion in the high engine load operation includes two kinds of combustions, that is, the combustion at the early stage Pe of the fuel injection period $P_H$ and the combustion at the late stage Pl. At the early stage Pe, because piston 8 has not yet come to a high position, the fuel obliquely injected from fuel injection nozzle 6 flows toward shallow dish portion 10 and adheres onto surfaces 10a and/or 10b of shallow dish portion 10. Then, the fuel is evaporated at surfaces 10a and/or 10b by heat from piston 8. The swirl S formed in combustion chamber 15 helps to promote the evaporation. Because there is a comparatively long time before the evaporated fuel is ignited, the entire amount of the fuel having adhered to surfaces 10a and/or 10b of shallow dish portion 10 is perfectly evaporated. Because the depth of shallow dish portion 10 is not great, most of the evaporated fuel flows out of shallow dish portion 10 to a large space between piston 8 and cylinder head 13 and is sufficiently mixed with the swirling air. The swirl S helps to mix the evaporated fuel with the air to form an even, properly rich mixed gas. On the other hand, the fuel obliquely injected from fuel injection nozzle 6 at the late stage Pl flows to deep dish portion 9 because piston 8 is at a comparatively high position, and the fuel having adhered onto surfaces 9a and/or 9b of deep dish portion 9 is evaporated, like in the case of the evaporation in the low engine load operation, to generate a properly rich mixed gas in deep dish portion 9 and pocket portion 9c. When piston 8 comes to a position close to the highest position and pocket portion 9c receives the lower end portion of spark plug 1 therein, the properly rich mixed gas including the evaporated fuel is ignited and is burned. The combustion propagates to the mixed gas including the fuel injected at the late stage Pl in deep dish portion 9 and then to the even, properly rich mixed gas including the fuel injected at the early stage Pe. Thus, the entire amount of the fuel is burned and the power characteristic in the high engine load operation is greatly improved. In this way, both a good ignition characteristic in the low engine load operation and an improved power characteristic in the high engine load operation are obtained in the engine in accordance with the present invention.

Next, effects obtained thanks to every particular structure of the fuel injection nozzle will be explained.

Firstly, the effects common to every embodiment will be explained.

Because spark plug 1 is located close to the axis of combustion chamber 15, more particularly, at the position surrounded by intake ports 2a and 2b and exhaust ports 5a and 5b and extends in parallel with the axis of combustion chamber 15, interference in location between spark plug 1 and the ports is prevented. The location of fuel injection nozzle 6 at the radially outer portion of combustion chamber 15 (more particularly, the structure that fuel injection nozzle 6 is located between intake ports 2a and 2b and extends in an upward and outward direction), in cooperation with that location of spark plug 1, makes it possible to smoothly mount spark plug 1 and fuel injection nozzle 6 in the limited space of the multiport engine without being accompanied by an increase in size of the engine. That relationship in location between spark plug 1 and fuel injection nozzle 6 prevents the fuel injected from fuel injection nozzle 6 from directly colliding with spark plug 1 and makes it possible, in cooperation with the structure of piston 8 including shallow and deep dish portions 10 and 9, to inject the fuel onto the surface of either one of shallow and deep dish portions 10 and 9 corresponding to the engine loads and the fuel injection timing to thereby promote the fuel evaporation. This greatly improves the combustion characteristic in comparison with the direct fuel injection to a spark plug. Further, the location of spark plug 1 close to the axis of combustion chamber 15 makes the flame propagation distance as short as possible, which helps the swift and perfect combustion of the mixed gas including the evaporated fuel. Further, the location of fuel injection nozzle 6 between intake ports 2a and 2b makes it possible to use the space between intake ports 2a and 2b, which was a non-available dead space in the prior art multiport engine, for a space for mounting fuel injection nozzle 6. This effectively makes the size of the engine compact.

The arrangement of the axis of shallow dish portion 10 offset from the axis of piston 8 and the axis of deep dish portion 9 further offset from the axis of piston 8 permits swirl S to gradually move in the direction close to fuel injection nozzle 6, when piston 8 is upwardly moved, to make one portion of swirl S flow into shallow and deep dish portions 10 and 9. This movement of swirl S is strongly obtained when piston 8 is at its nearly highest position. This effectively prevents the rich mixed gas in deep dish portion 9 from flowing out of deep dish portion 9 and contributes to the good ignition. Also, the movement of swirl S functions to strengthen the swirl in shallow and deep dish portions 10 and 9, because the strong flow located at a perihery portion of the swirl S is moved into shallow and deep dish portions 10 and 9. The strengthened swirl promotes the evaporation of the fuel having adhered onto the surfaces of shallow and deep dish portions 10 and 9. The offsetting of deep dish portion 9 relative to shallow dish portion 10 and the tangential contact of the circular contours of shallow and deep dish portions 10 and 9 at the portions thereof closest to fuel injection nozzle 6 assure a stable movement of the swirl S in the direction toward fuel injection nozzle 6. The circular contour structures of deep dish portion 9 and at least the deepest portion of shallow dish portion 10 help the swirl S to be strongly generated in shallow and deep dish portions 10 and 9 and also prevent the swirl S from being weakened Surfaces 10a and 10b of shallow dish portion 10 and surfaces 9a and 9b of deep dish portion 9 function as a surface for evaporating the fuel. Side surface 10b of shallow dish portion also functions as a surface for preventing the fuel injected onto bottom surface 10a from flowing to and adhering to the inside surface of cylinder 12.

Pocket portion 9c functions to cause the evaporated fuel to momentarily stay in pocket portion 9c to thereby obtain a good ignition characteristic. Pocket portion 9c further functions to cause the mixed gas to stagnate in pocket portion 9c to thereby prevent the flame caused by spark plug 1 from being blown out due to a too strong flow of the swirl in deep dish portion 9.

Swirl port 2a functions to generate swirl S in combustion chamber 15 to thereby promote the evaporation of fuel. The flow of the intake gas introduced into combustion chamber 15 through another port 2b collides with the swirl S, preferably at a right angle, to thereby effectively generate micro-turbulences and to improve the combustibility of the mixed gas without weakening the swirl S. Because there is no necessity to locate spark plug 1 between exhaust ports 5a and 5b because of the location of spark plug 1 close to the axis of combustion chamber 15, exhaust ports 5a and 5b can be arranged so as to extend straight in the plan view thereof to thereby decrease the flow resistance of the exhaust gas and to improve the power characteristic of the engine.

Because fuel injection nozzle 6 has multiholes for injecting fuel 7 (fuels 7a, 7b, 7c and 7d shown in FIG. 3) and at least one of the multiholes, for example, two holes are directed so as to inject fuels 7c and 7d toward the portions of the surfaces of the dish portions located more upstream than spark plug 1 in the swirl direction, the evaporated fuel of injected fuels 7c and 7d can arrive at spark plug 1 in a short period of time to form a rich mixed gas in pocket portion 9c. This assures a reliable ignition.

Next, the effects specific to each embodiment will be explained.

In the first embodiment, where shallow dish portion 10 comprises a single concave portion, all the above-described effects are obtained.

In the second embodiment, where shallow dish portion 10 comprises a plurality of concave portions 10A and 10B (see FIG. 5), in addition to the effects of the first embodiment, the effect that the movement of swirl S is more smooth in the first embodiment is obtained due to concave portions 10A and 10B.

In the third embodiment, where protrusion 11 having the straight extending side surface 11a is provided, in addition to the effects of the second embodiment, the effect that a squish flow is further generated is obtained due to protrusion 11. More particularly, protrusion 11, in cooperation with lower surface 13a of cylinder head 13, generates a squish flow which flows in the direction toward fuel injection nozzle 6. Such a squish flow is usually stronger than a swirl. Thus, the movement of the swirl S in the direction toward fuel injection nozzle 6 is greatly promoted by the squish flow. Further, the squish flow helps the flame propagation in the direction toward fuel injection nozzle 6 to thereby improve the combustion.

In the fourth embodiment, where protrusion 11 having the curved side surface 11a' is provided, in addition to the effects of the third embodiment, the effect that the swirl S is unlikely to be weakened is obtained due to the curved side surface 11a'.

Although only several embodiments of the invention have been described in detail above, it will be appreciated by those skilled in the art that various modifications and alterations can be made to the particular embodiments shown without materially departing from the novel teachings and advantages of the invention. Accordingly, it is to be understood that all such modifications and alterations are included within the spirit and scope of the present invention as defined by the following claims.

What is claimed is:

1. A direct fuel injection type spark ignition internal combustion engine comprising:
   a piston/cylinder structure including a cylinder, a piston reciprocally movable in the cylinder, and a cylinder head located above the cylinder; the piston including a shallow dish portion and a deep dish portion formed in a top portion of the piston; an inside surface of the cylinder, an upper surface of the piston including surfaces of the shallow and deep dish portions and a lower surface of the cylinder head defining a combustion chamber therein; the piston/cylinder structure further including two intake ports and at least one exhaust port formed in the cylinder head and communicating with the combustion chamber;
   a spark plug located close to an axis of the combustion chamber and coupled to the cylinder head so as to protrude into the combustion chamber from the lower surface of the cylinder head;
   a fuel injection nozzle located at a radially outer portion of the combustion chamber, a fuel injection direction and fuel injection timing of the fuel injection nozzle being predetermined for high and low engine load operation, the fuel injection nozzle having at least one fuel injection hole for injecting a fuel to be injected toward the shallow dish portion at an early stage of an injection period of a fuel injection timing in the high engine load operation, toward the deep dish portion at a late stage of the injection period of the fuel injection timing in the high engine load operation and during an entire stage of an injection period of a fuel injection timing in the low engine load operation, and wherein an axis of the shallow dish portion and an axis of the deep dish portion are offset from an axis of the piston on the side close to the fuel injection nozzle, the axis of the deep dish portion being offset further from the axis of the piston than the axis of the shallow dish portion.

2. The engine according to claim 1, wherein the spark plug is located at a position radially surrounded by the two intake ports and the exhaust port in a direction perpendicular to the axis of the combustion chamber, and the fuel injection nozzle is located between the two intake ports.

3. The engine according to claim 1, wherein an axis of the spark plug, an axis of the fuel injection nozzle and an axis of the piston are located in a common plane including the axis of the combustion chamber, and the fuel injection nozzle is located on an opposite side of the spark plug with respect to the axis of the combustion chamber.

4. The engine according to claim 1, wherein the spark plug upwardly extends from an upper portion of the combustion chamber substantially in parallel with the axis of the combustion chamber, and the fuel injection nozzle obliquely extends from the radially outer portion of the combustion chamber in an upward and radially outward direction.

5. The engine according to claim 1, wherein a contour of the deep dish portion and a contour of at least a deepest portion of the shallow dish portion are circular, the circular contour of the deepest portion of the shallow dish portion being larger than the circular contour of the deep dish portion, and the circular contours of the deepest portion of the shallow dish portion and the deep dish portion tangentially contacting each other at portions thereof closest to the fuel injection nozzle.

6. The engine according to claim 1, wherein the shallow dish portion has a flat bottom surface extending in a direction perpendicular to an axis of the piston and a side surface upwardly extending from a radially outermost portion of the bottom surface of the shallow dish portion, and the deep dish portion has a flat bottom surface extending in the direction perpendicular to the axis of the piston and an upwardly extending side surface curvedly connected to a radially outermost portion of the bottom surface of the deep dish portion.

7. The engine according to claim 1, wherein the deep dish portion has a pocket portion at a portion of the deep dish portion located on an opposite side of the fuel injection nozzle with respect to an axis of the deep dish portion, the pocket portion receiving a lower end portion of the spark plug therein when the piston reaches its nearly highest position in the reciprocal motion thereof.

8. The engine according to claim 1, wherein one of the intake ports is a swirl port for introducing an intake gas into the combustion chamber in a direction tangential to a circle having its center on the axis of the combustion chamber.

9. The engine according to claim 1, wherein one of the intake ports is a port for introducing an intake gas into the combustion chamber in a direction toward the axis of the combustion chamber.

10. The engine according to claim 1, wherein the exhaust port extends straight in a direction perpendicular to the axis of the combustion chamber.

11. The engine according to claim 1, wherein the fuel injection nozzle comprises a nozzle having multiholes for injecting fuel.

12. The engine according to claim 11, wherein at least one of the multiholes of the fuel injection nozzle is directed so as to inject fuel toward a portion of the deep dish portion located at an upstream side of the spark plug in a direction of a swirl flow formed in the combustion chamber at the late stage of the injection period in the high engine load operation and at the entire stage of the injection period in the low engine load operation.

13. The engine according to claim 1, wherein the shallow dish portion comprises a single concave portion.

14. The engine according to claim 1, wherein the shallow dish portion comprises at least two concave portions which interferes with each other in location.

15. The engine according to claim 1, wherein the piston includes, at one portion of its top portion located on the opposite side of the fuel injection nozzle with respect to an axis of the piston, an upwardly projecting protrusion with an upper surface that cooperates with the lower surface of the cylinder head to fill one portion of the combustion chamber when the piston moves to its highest position.

16. The engine according to claim 15, wherein the protrusion has an upwardly extending side surface on the side opposing the spark plug, the side surface of the protrusion extending straight in a direction transverse to and perpendicular to an extension of a line connecting an axis of the spark plug and an axis of the fuel injection nozzle.

17. The engine according to claim 15, wherein the protrusion includes an upwardly extending side surface on the side opposing the spark plug, the side surface of the protrusion extending in an arc concave to the spark plug in a direction transverse to an extension of a line connecting an axis of the spark plug and an axis of the fuel injection nozzle.

* * * * *